Feb. 17, 1970     C. B. TOLLEY     3,495,293
MACHINE FOR PREPARING A HARD SHELL CRAB FOR MEAT REMOVAL
Filed June 8, 1967     3 Sheets-Sheet 1
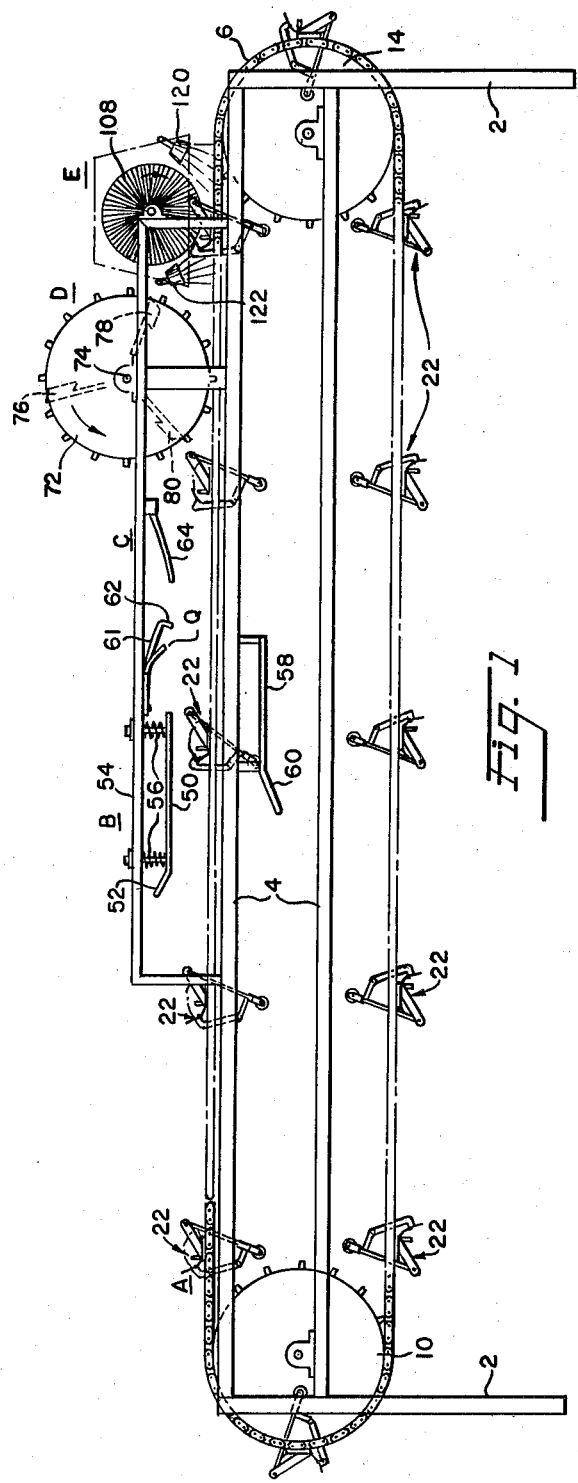
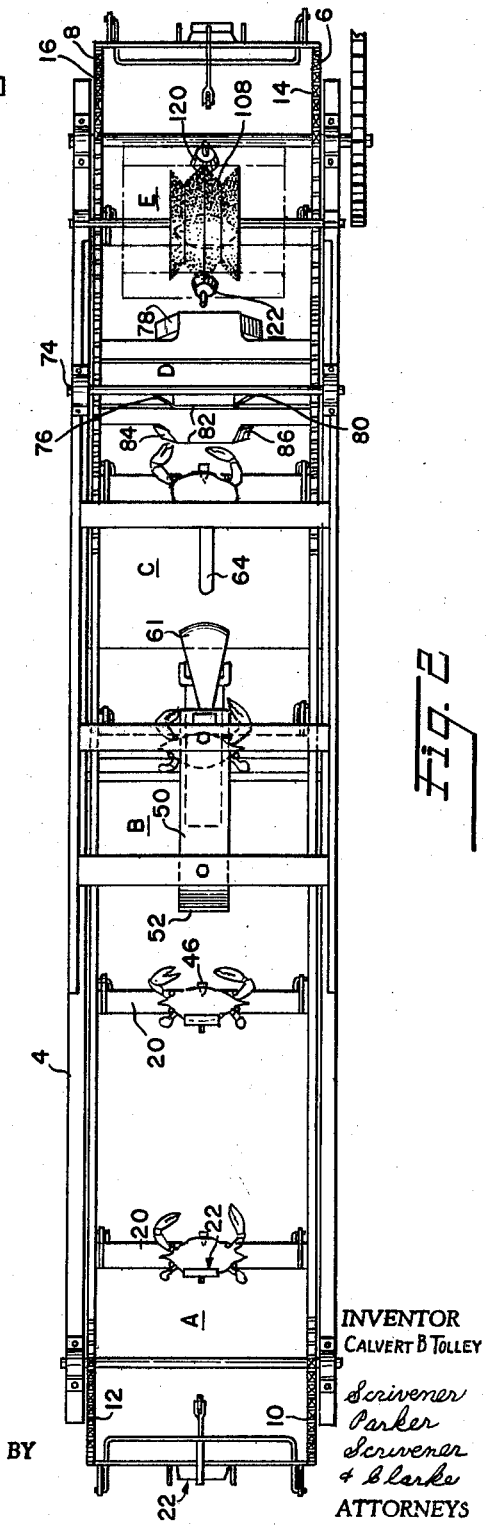
INVENTOR
CALVERT B TOLLEY
Scrivener
Parker
Scrivener
& Clarke
ATTORNEYS

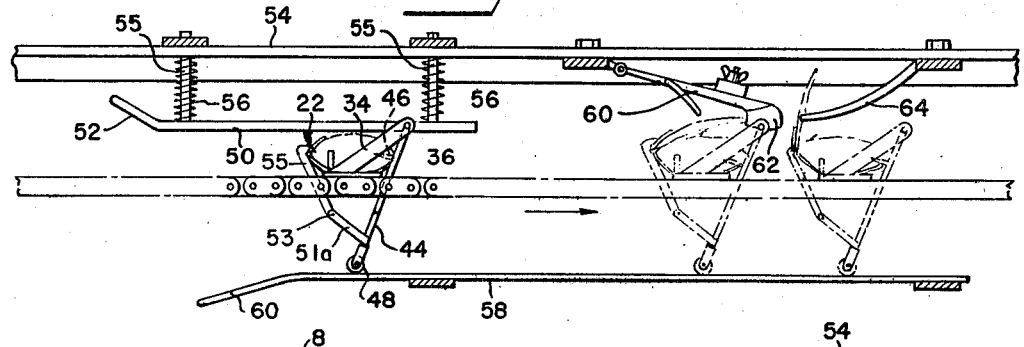
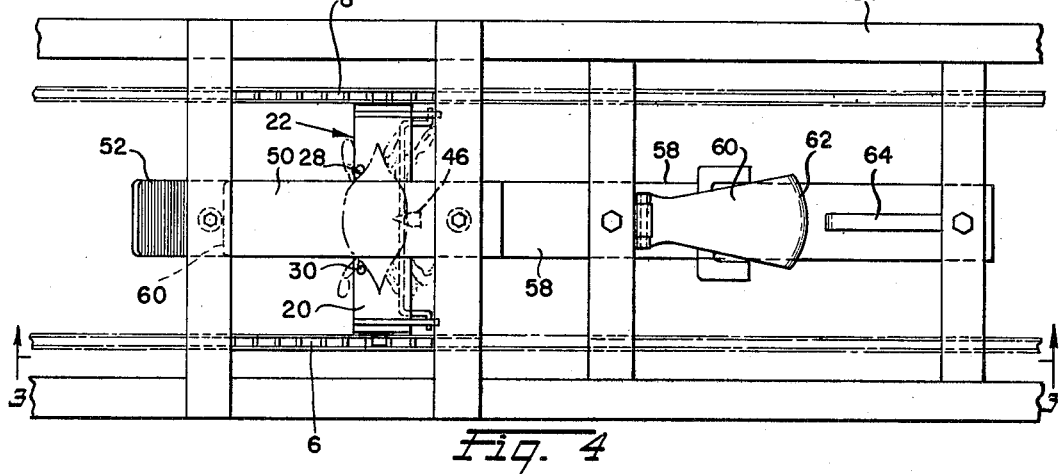
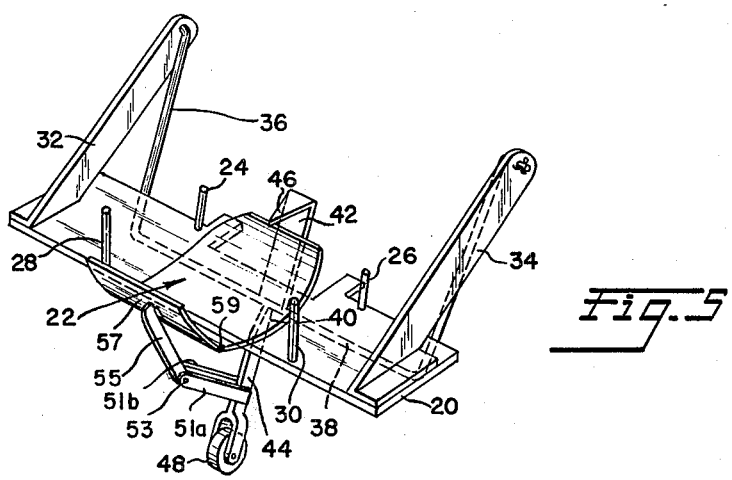

Feb. 17, 1970  C. B. TOLLEY  3,495,293
MACHINE FOR PREPARING A HARD SHELL CRAB FOR MEAT REMOVAL
Filed June 8, 1967  3 Sheets-Sheet 3
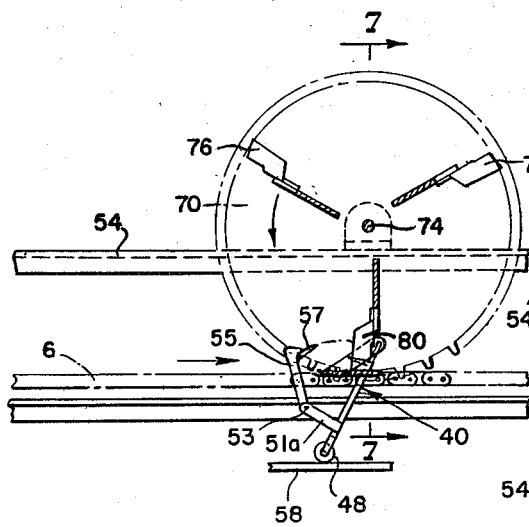
Fig. 6
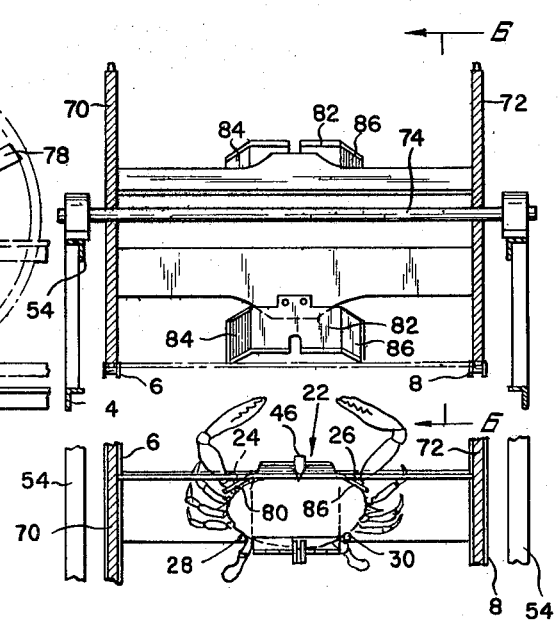
Fig. 7
Fig. 8
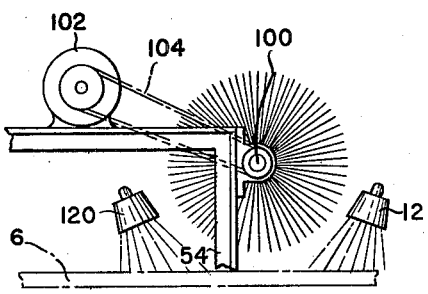
Fig. 9
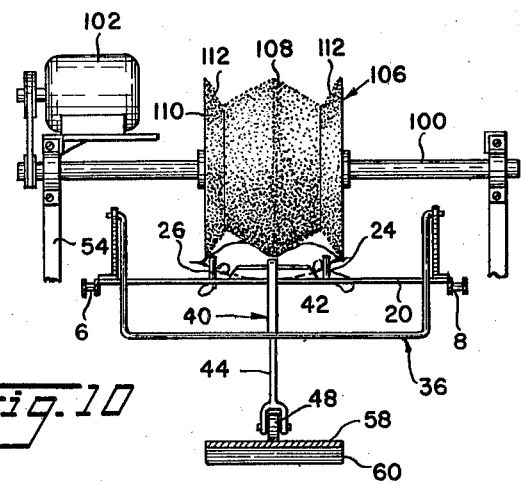
Fig. 10
INVENTOR
CALVERT B. TOLLEY
BY
Scrivener Parker Scrivener + Clarke
ATTORNEYS United States Patent Office 3,495,293
Patented Feb. 17, 1970

3,495,293
MACHINE FOR PREPARING A HARD SHELL CRAB FOR MEAT REMOVAL
Calvert B. Tolley, Wingate, Md. 21675
Filed June 8, 1967, Ser. No. 644,652
Int. Cl. A22c 29/00
U.S. Cl. 17—71                                    10 Claims

ABSTRACT OF THE DISCLOSURE

A machine for sequentially operating on cooked hard shell crabs by removing the back shell, cutting off the claws, and washing and brushing the remaining body to remove the viscera and lungs.

SUMMARY OF THE INVENTION

In my United States Letters Patent No. 3,245,105, issued Apr. 12, 1966, for Apparatus for Cutting the Body of a Crab, there is disclosed a machine for cutting the prepared body of a hard shell crab to remove the flippers and expose the back lump parts of the meat, thus facilitating greatly the removal of the back lumps, either by hand or machine operation. The present invention provides a machine for preparing the crab, after cooking, for processing by the cutting machine disclosed in that Letters Patent.

In the machine of the present invention cooked whole hard shell crabs are supplied one-by-one to a continuously operating endless-belt conveyor and are sequentially operated on by means which remove the carapace, or back shell, then cut off the claws, leaving the flippers, then wash and brush the remaining open body to remove the viscera and lungs. The resulting opened and cleaned bodies may then be supplied, one at a time, to the cutting machine referred to above for further processing.

DESCRIPTION OF THE DRAWINGS

FIG. 1 is a side elevational view of a machine according to the present invention;

FIG. 2 is a top elevational view of the machine;

FIG. 3 is an enlarged side view of the parts of the machine which remove the carapace;

FIG. 4 is a top view of the parts shown in FIG. 3;

FIG. 5 is an enlarged perspective view of parts shown in FIGS. 3 and 4 for holding the crab body while being processed by the machine;

FIG. 6 is a side view of the parts of the machine for cutting off the claws of the crab;

FIG. 7 is a sectional view taken on line 7—7 of FIG. 6;

FIG. 8 is a top plan view of parts of the machine for holding the crab during processing by the machine, and illustrating also the action of the knives of FIGS. 6 and 7 in cutting off the claws;

FIG. 9 is a side elevational view of the parts of the machine for removing the viscera and lungs, and FIG. 10 is an end view of the parts shown in FIG. 9.

DETAILED DESCRIPTION OF THE INVENTION

The crab processing machine provided by the invention comprises, first, a supporting structure having vertical legs 2 and horizontal frame members 4, all of which may be of suitable size and arrangement to hold either the machine of the invention alone or to hold both that machine and other machines with which it may be associated, such as that disclosed in the Letters Patent referred to above.

Means are provided by the invention for receiving and holding whole, cooked hard shell crabs and continuously moving each of them to successive stations of the machine at which they are subjected to one of the successive operations provided by the machine. The means for moving the crabs through the machine is an endless conveyor comprising two parallel laterally spaced endless chains 6, 8 which are trained, respectively, about sprocket wheels 10, 12 at the intake end of the machine, and about similar sprocket wheels 14, 16 at the delivery end of the machine. Each pair of sprocket wheels is rotatably mounted on a shaft which extends transversely of the length of the machine and which is journaled in bearings on the machine frame. Any suitable means such as an electric motor (not shown) may be provided to rotate the sprocket wheels 10, 12 and 14, 16 and move the endless chains 6, 8 longitudinally of the machine and to the successive work stations of the machine, and this motor may also operate other machines associated with that being described.

Means are provided by the invention for holding each whole crab on the endless conveyor 6, 8 for processing at the successive work stations of the machine. These means are shown in detail in FIG. 5 and comprises, first, a flat plate 20 which is attached at its ends to the endless chains 6, 8 and extends between them. At the center of the upper surface of this plate there is fixed a cradle 22 the upper surface of which is of proper size and configuration to receive the apron of a hard shell crab of legal size. Adjacent the front edge of the plate, i.e. the leading edge in the direction of movement of the conveyor, are two relatively short, forwardly-projecting, upstanding pins 24, 26 which are spaced equally on either side of the cradle 22 and are separated by a distance equal to the usual distance between the claw knuckles of a crab. Adjacent the rear edge of the plate, i.e. the trailing edge in the direction of movement of the conveyor, are two longer, straight, upstanding pins 28, 30 which are spaced equally on either side of the cradle 22 and are separated by a distance equal to the usual distance between the knuckles of the back flippers of a crab. At the lateral ends of the plate 20 there are rigidly attached two upstanding support members 32, 34 which at their upper ends pivotally support the upper ends of the side arms of a depending U-shaped bail 36 having a cross arm 38. Connected to the midpoint of this cross arm is a vertical arm 40 having an upper part 42 extending above the cross arm and a lower part 44 extending below the cross arm. The upper end of the upper part 42 is provided with a pointed spear 46 which is directed toward the plate 20 and which, when it is swung to a position adjacent the plate, lies just above the upper edge of the cradle 22. The lower end of the lower part 44 is provided with a roller 48 for a reason and with a function which will be described. Adjacent the rear edge of the plate, i.e. the trailing edge in the direction of movement of the conveyor, and connected to the arm 44 above the wheel 48 are two rearwardly extending arms 51a, 51b provided at their ends with a hinge pin 53. An arm 55 is connected to the hinge pin 53, the upper end of which is affixed to a curved plate 57 which is attached to cradle 22 by pin 59.

It will be apparent from the foregoing description that when a crab is placed, apron down, on the cradle 22 with its claws hooked over pins 24, 26 and its rear flippers hooked over pins 28, 30 it will be held firmly against horizontal movement. This position and arrangement of the crab on the cradle is illustrated in FIG. 8. If, now, the arm 42, 44 is operated to move the pointed spear 46 toward plate 20 it will be forced into the mouth of the crab, holding the crab from movement upward from the cradle. Also, by means of the linkage at the rear edge of the cradle, the curved plate 57 will engage the other side of the crab to additionally hold it in place. The described means therefore anchor the crab firmly to the cradle and prevent horizontal or vertical movement of its body, claws and flippers. Obviously, any number of such crab holding means may be provided in the machine, and FIGS. 1 and 2 show a plurality thereof along the length of the endless conveyor.

Means are provided by the invention, which are operative at position B, which is adjacent the intake end of the machine, for operating the spear 46 and the plate 57 in the described manner to hold the crab body on the cradle. As the machine is operated, a cooked hard shell crab is placed on each cradle 22 in the manner described above at the loading station A, the direction of travel of the conveyor being shown by the arrow in FIG. 1. In the direction of movement of the conveyor from the loading station there is provided a pressure plate 50 which is disposed above the conveyor by a distance less than the combined height of the plate 20, cradle 22 and the crab, whereby it engages the upper surface of the back of the crab as the plate 20 passes under it. The pressure plate has an upwardly inclined forward end 52 permitting the crab body to pass beneath the plate, and is supported from an upper part 54 of the machine on slidable pins 55 surrounded by springs 56 which resiliently urge the plate downwardly but permit it to be moved upwardly against the force of the springs.

Beneath the conveyor, beginning at approximately the entrance end of pressure plate 50, is a cam plate 58 having a downwardly inclined entrance end part 60, this cam plate being positioned sufficiently below the conveyor that it is engaged by the roller 48 on the extremity of lower arm 44 of the crab holding and supporting device, to swing the arm and its connected bail 36 in a clockwise direction, as viewed in FIG. 3, about their pivotal support at the upper ends of the arms of the bail, thereby forcing the pointed spear 46 into the mouth of the crab to hold the body of the crab down to the cradle. At the same time the linkage arrangement attached to arm 44 will be activated to cause the plate 57 to move into engagement with the body of the crab. The cam plate 58 extends to the delivery end of the machine and is engaged by roller 48 throughout the entire operative length of the machine in order to anchor the crab body to the plate 20 during all operations performed by the machine.

Means are provided by the invention for removing the back shell or carapace from the crab after the pointed spear 46 has been operated to hold the crab down on the carrying cradle 22. These means are located at position C, which is spaced from the pressure plate 50 in the direction of movement of the conveyor and comprise an arm 61 which is connected at its one end to the upper machine frame member 54 and extends from such connection in the direction of travel of the conveyor, having at its free end a downwardly and rearwardly (i.e. in the direction opposite to the direction of movement of the conveyor) extending hook part 62 which is disposed at a level just above that of the spear 46 and is therefore positioned to engage the forward edge of the carapace as the crab body moves with the conveyor. Spaced from the hook member 61, 62 in the direction of movement of the conveyor is an ejector member 64 which is connected at its one end to the lower surface of upper machine frame part 54 and extends therefrom in the direction opposite to the direction of movement of the conveyor and at such a height above the conveyor that it lies in the path of the carapace which has been lifted from the crab body, and will therefore prevent movement of the carapace with the crab body as the body moves with the conveyor.

It will be seen that the operation of the machine to this point has been to position the crab body in a predetermined position on an endless conveyor, to attach the crab body firmly to the conveyor so that operations may be performed on it, and to remove the carapace from the body.

Means are now provided by the invention for cutting the two claws from the crab body, these means being located at position D, which is spaced from the carapace removing means 61, 62, 64 in the direction of movement of the conveyor. The cutting means are illustrated in FIGS. 6, 7 and 8 and comprise two sprocket wheels 70, 72 which are rotatably mounted on a shaft 74 extending transversely of the conveyor and which, in turn, is journaled on the upper machine frame part 54. The teeth on the peripheries of the two sprocket wheels are engaged, respectively, by the links of the two conveyor chains 6, 8 and are rotated thereby as the conveyor moves. Between the two sprocket wheels, and supported by them, are three radially extending knives 76, 78, 80 which are spaced equidistantly about shaft 74 and each of which has a central blade 82 which is parallel to shaft 74 and two end blades 84, 86 which diverge, respectively, from the opposite ends of the central part, the configuration of the three blades (or the three parts of the blade) being such that when they are brought down on the front edge of a crab the central blade severs the mouth, eyes and adjacent parts of the crab body and the end blades sever the claws at the knuckles joining the claws to the body. This cutting action of the knives is illustrated in FIG. 8.

It is important to note that the spacing of the crab holding plates 20 along the conveyor and the position and speed of rotation of the knife assembly are so related that one of the knives will move into operative cutting position as a crab holding plate arrives at the proper position for the cutting operation, which is therefore automatically performed.

Means are provided by the invention, which are operable after removal of the carapace and claws, for cleaning the visceral cavity of the carcass and removing the lungs, and such means include both means for brushing and flushing with water. These cleaning operations are performed at location E, which is spaced from the knife assembly in the direction of movement of the conveyor and the means for performing them are illustrated in FIGS. 1, 9 and 10. The brushing means comprises a shaft 100 journaled on the upper machine frame 54 and extending transversely to the conveyor at a position upstream from the knife assembly, and rotated by motor 102 through belting 104. The shaft carries a wide brush 106 formed of strong bristles and having a peripheral surface corresponding in shape to the lateral sectional shape of the crab carcass after removal of the carapace. Thus, the central part of the brush is outwardly extended in a ridge 108 which, as shown in FIG. 10, fits into the visceral cavity of the carcass on each plate 20, it being remembered and understood that the position of the carcass on the plate is such that the axis of the visceral cavity extends parallel to the direction of movement of the conveyor. The central part of the periphery of the brush is therefore convex to enter and clean the visceral cavity, and on each side of this central convex part, i.e. at each lateral edge of the brush, there is a frusto-conical part 110 having an inner outwardly inclined surface 112 which is generally shaped to conform to the outer surface of one of the meat-containing mounds of the carcass, which is the surface on which the lungs are found. The valley between each side of the central convex part 108 and the adjacent frusto-conical part surrounds and cleans the top and inside of the meat containing mound of the carcass.

Associated with the brushing means at station E are water spray means 120, 122 for flushing out the visceral cavity and exterior surfaces of the carcass. This spray means is illustrated in FIG. 9 and comprises one or more nozzles or spray heads 120, 122 positioned upstream from the brush 106 and arranged and operative to direct a stream of water under pressure onto and into the carcass in order to clean it and remove any loose bits of undesired matter.

I claim:
1. Apparatus for processing cooked hard shell whole crabs to remove non-edible parts therefrom, comprising a frame;
endless conveyor means connected with said frame;
a plurality of crab supporting means mounted in longitudinally spaced relation on said conveyor means, each of said crab supporting means including a base plate connected with said conveyor means, a cradle carried by said plate, said cradle having a curved configuration for receiving a centered forwardly-directed crab body the carapace portion of which is directed upwardly, pin means extending upwardly from said plate on opposite sides of said cradle to engage external surfaces of the crab body behind the claws and the rear flippers thereof, respectively, and spear means pivotally connected with the forward edge of said plate, said spear means including a spear portion and being pivotable in direction causing said spear portion to enter the mouth portion of the crab and thereby anchor the crab body to the cradle;
carapace lifting means connected with the frame in the path of the anchored crab body for lifting the carapace portion from the crab body during transport by said conveyor means; and
stationary carapace breaking means connected with said frame in spaced relationship relative to said lifting means, said breaking means engaging said lifted carapace to break the same from the crab body.

2. Apparatus as defined in claim 1, and further including cutting means spaced longitudinally of said conveyor means relative to said carapace breaking means for cutting the claws from the body, means spaced from said cutting means longitudinally of the conveyor for brushing and flushing with water opened body to remove the viscera and lungs, and means connected with said frame for maintaining said spear means in the crab body anchoring position during transport of the crab support means past said cutting means and said brushing and flushing means.

3. A machine according to claim 2, in which the spacing of the crab-supporting members along the conveyor and the position and arrangement of the means for cutting claws from the body are so related that a cutting means is moved to operative cutting position with respect to each crab-supporting member when such member arrives at the cutting means.

4. A machine according to claim 2, in which the brushing means comprises a rotatable brush, a rotatable shaft on which the brush is mounted and which extends transversely of the conveyor, the brush being mounted above the conveyor in a position to engage the crab body.

5. A machine according to claim 4, in which the peripheral surface of the brush comprises a central convex part constructed and positioned to enter the central visceral cavity in the crab body, concave parts at the lateral side edges of said convex part for engaging the convex surfaces of the meat-containing mounds at either side of the central visceral cavity, and frusto-conical parts at the lateral side edges of the brush for engaging and removing the lungs on the outer side surfaces of the body of the crab.

6. A machine according to claim 4, comprising in addition means positioned above the conveyor and spaced from the brushing means in the direction of movement of the conveyor for directing a spray of water under pressure onto the crab body.

7. Apparatus as defined in claim 1, wherein said means for lifting the carapace from the crab comprises an arm connected with said frame above the conveyor and extending therefrom in the direction of movement of the conveyor, said arm having at its free end a reversely-extended hook portion for engaging the leading edge of the carapace to lift the same from the crab body.

8. Apparatus as defined in claim 7, wherein said carapace breaking means comprises a second arm connected with said frame above the conveyor and extending in a direction opposite to the direction of movement of the conveyor.

9. A machine according to claim 1, in which the means for cutting the claws from the body comprise a rotatable knife assembly positioned above the conveyor and spaced from the carapace removing means in the direction of movement of the conveyor, interengaging means between the conveyor and the knife assembly for rotating the knife assembly, said knife assembly comprising a rotatable shaft extending transversely of the conveyor, a plurality of knives extending radially of said shaft, each of said knives being shaped to conform to the mouth edge of a crab and having lateral side parts positioned to engage the claws at the knuckles thereof to cut the claws from the body.

10. Apparatus as defined in claim 9, wherein each of said knives comprises a central part extending transversely of the conveyor between said lateral side parts, said lateral side parts diverging outwardly from said central part in the direction opposite the direction of movement of said conveyor.

References Cited

UNITED STATES PATENTS

| | | |
|---|---|---|
| 3,151,351 | 10/1964 | Reinke. |
| 3,200,436 | 8/1965 | Moncure. |
| 3,245,105 | 4/1966 | Tolley. |
| 3,302,236 | 2/1967 | Harris. |
| 3,370,319 | 2/1968 | Houghton et al. |

LUCIE H. LAUDENSLAGER, Primary Examiner

U.S. Cl. X.R.

17—48